US008300619B2

(12) United States Patent
Valdivia et al.

(10) Patent No.: US 8,300,619 B2
(45) Date of Patent: Oct. 30, 2012

(54) SYSTEM AND METHOD FOR PROVIDING SCHEDULED DATA COMMUNICATIONS IN A COMMUNICATION SYSTEM

(75) Inventors: Mary Mak Valdivia, Lake Zurich, IL (US); Joseph Baum, Cary, IL (US); Ronald V. Gillis, Elburn, IL (US); Joseph Rinchiuso, Elmhurst, IL (US)

(73) Assignee: Motorola Solutions, Inc., Schaumburg, IL (US)

( * ) Notice: Subject to any disclaimer, the term of this patent is extended or adjusted under 35 U.S.C. 154(b) by 1218 days.

(21) Appl. No.: 11/938,545

(22) Filed: Nov. 12, 2007

(65) Prior Publication Data

US 2009/0122780 A1    May 14, 2009

(51) Int. Cl.
*H04J 3/24* (2006.01)
(52) U.S. Cl. ...................................................... 370/349
(58) Field of Classification Search .................. 370/349, 370/310, 310.2, 338, 277, 278, 341, 432, 370/458, 465, 471, 473, 329, 2, 276, 312, 370/324, 388
See application file for complete search history.

(56) References Cited

U.S. PATENT DOCUMENTS

| 6,215,980 | B1 * | 4/2001 | Kim ................................. 455/91 |
| 6,373,856 | B1 * | 4/2002 | Higashida ...................... 370/474 |
| 6,731,602 | B1 * | 5/2004 | Watanabe et al. ............. 370/231 |
| 7,016,361 | B2 * | 3/2006 | Swonk et al. ................. 370/401 |
| 7,215,652 | B1 * | 5/2007 | Foley et al. .................... 370/319 |
| 7,626,966 | B1 * | 12/2009 | Ruiter et al. .................. 370/337 |
| 2007/0276955 | A1 * | 11/2007 | Edsberg ......................... 709/237 |

OTHER PUBLICATIONS

Office Action mailed on Apr. 14, 2011 in counterpart Australian Patent Application No. 2008321258.

* cited by examiner

*Primary Examiner* — Chi Pham
*Assistant Examiner* — Alexander Boakye
(74) *Attorney, Agent, or Firm* — Terri Hughes Smith; Kenneth A. Haas

(57) ABSTRACT

A system and method for enabling scheduled data messages to be transmitted within a communication system on a controlled access packet data channel. When a scheduled data message is to be transmitted, a mobile device generates the data message, appends a predetermined type of header to the data message, and passes the data message to a communication unit. The header comprises an hour field, a minute field, and a slot field indicative of a specific time when the data message is to be transmitted on the controlled access packet data channel. After receiving a data message from the mobile device, the communication unit parses the received data message to determine whether the received data message should be processed as a scheduled data message on the controlled access packet data channel, and transmits the data message to a fixed network at a specific time based on the hour, minute, and slot fields in the header.

20 Claims, 5 Drawing Sheets

SYSTEM AND METHOD FOR PROVIDING SCHEDULED DATA COMMUNICATIONS IN A COMMUNICATION SYSTEM

TECHNICAL FIELD OF THE DISCLOSURE

This disclosure relates generally to data communications, and more particularly, to a system and method for providing scheduled data communications in a communication system.

BACKGROUND OF THE DISCLOSURE

Communication systems generally include a plurality of communication units, such as mobile or portable radio units, that are geographically distributed among various base sites. The communication units wirelessly communicate with the base sites and each other, and are often logically divided into various talkgroups. Communication systems may be organized as trunked systems, where a plurality of radio frequency (RF) communication resources are allocated amongst multiple users or groups by assigning the base sites and RF channels within a coverage area on a call-by-call basis, or as conventional (non-trunked) systems where RF communication resources are dedicated to one or more users or groups. In trunked systems, or in mixed trunked and conventional systems, there is usually provided a central controller/server (sometimes called a "zone controller") for allocating RF communication resources among a group of sites. The zone controller may reside within a single device or multiple devices and may be located at a fixed equipment site or may be distributed among the base sites.

Typical communications systems, such as those in compliance with Association of Public-Safety Communications Officials-International (APCO) Project 25 standards, transmit data messages amongst the communication units and base sites using preset packet data channels ("also referred to herein as classic packet data channels"). These classic packet data channels are used to provide unscheduled delivery of data in both the inbound and outbound directions. More specifically, whenever a communication unit needs to transmit a data message, the communication unit checks whether the inbound packet data channel (i.e., the channel used for data communications from the communication units to a base site) is busy or idle. In APCO Project 25 systems, this is typically accomplished by reference to status symbols transmitted on the outbound packet data channel (i.e., the channel used for data communications from a base site to the communication units) that identify the status of the inbound packet channel. The specific protocols for such status symbols in an APCO Project 25 system are described in Telecommunications Industry Association (TIA) 102.BAAD.

Once the communication unit determines that the inbound packet data channel is idle, the communication unit attempts to transmit the data message. However, in communication systems that employ a large number of communications units occupying the same packet data channel, it is often the case that multiple communication units attempt to transmit a data message at the same time. This results in the deterioration or loss of the data messages transmitted from each of these multiple communication units.

Additionally, because data message transmissions are prone to such failures, communication systems also typically require a confirmation message be sent from the receiving device back to the originally transmitting communication unit on the outbound packet data channel to confirm receipt of the data message. This utilizes a significant amount of bandwidth on the outbound packet data channel.

BRIEF DESCRIPTION OF THE FIGURES

Various embodiment of the disclosure are now described, by way of example only, with reference to the accompanying figures.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help improve the understanding of various embodiments of the present disclosure. Also, common but well-understood elements that are useful or necessary in a commercially feasible embodiment are not often depicted in order to facilitate a less obstructed view of these various embodiments of the present disclosure. It will be further appreciated that certain actions and/or steps may be described or depicted in a particular order of occurrence while those skilled in the art will understand that such specificity with respect to sequence is not actually required. It will also be understood that the terms and expressions used herein are to be defined with respect to their corresponding respective areas of inquiry and study except where specific meaning have otherwise been set forth herein.

DETAILED DESCRIPTION OF THE DISCLOSURE

The present disclosure provides a system and method for enabling scheduled data messages to be transmitted within a communication system on a controlled access packet data channel. When a scheduled data message is to be transmitted, a mobile device generates the data message, appends a predetermined type of header to the data message, and passes the data message to a communication unit. The header comprises an hour field, a minute field, and a slot field indicative of a specific time when the data message is to be transmitted on the controlled access packet data channel.

After receiving a data message from the mobile device, the communication unit parses the received data message to determine whether the received data message should be processed as a scheduled data message on the controlled access packet data channel. This may involve determining whether the destination address of the data message matches a predetermined set of destination addresses reserved for scheduled data message, validating the information in the header, and/or confirming that the data message is of a size that can be transmitted in the controlled access packet data channel. If the communication unit does determine that the data message should be processed as a scheduled data message, the communication unit transmits the data message to a fixed network at a specific time based on the hour, minute, and slot fields in the header.

Figure 1:
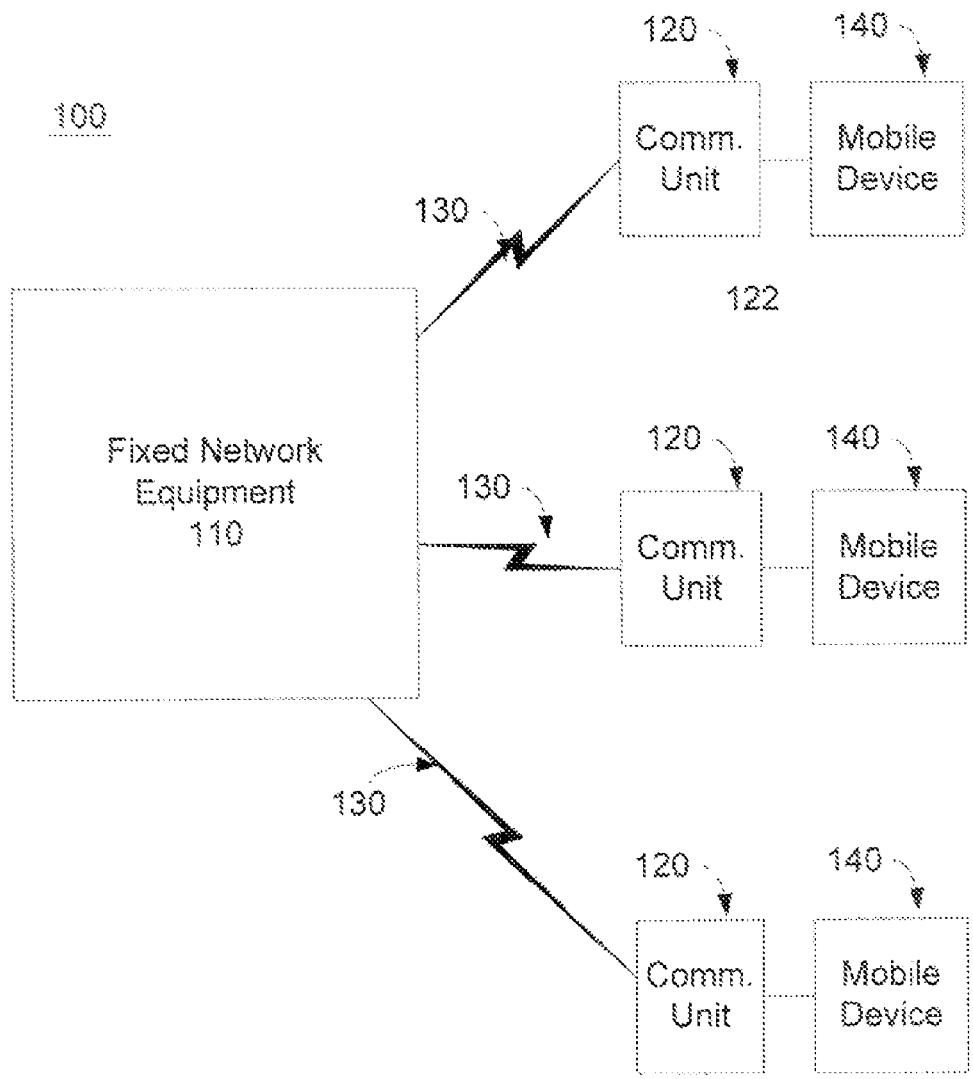
FIG. 1 shows one embodiment of a communication system in accordance with the present disclosure.

Let us now discuss the present disclosure in greater detail by referring to the figures below. FIG. 1 shows one embodiment of a communication system 100 in accordance with the present disclosure. The system 100 comprises a plurality of communication units 120 that are in wireless communication with a fixed network 110 via one or more wireless communication resources 130. The fixed network 110 may comprise any number of convention devices as is well known in the art. For example, the fixed network 110 may comprise a plurality of base sites, each of which may comprise a plurality of repeaters that are capable of receiving and retransmitting messages amongst the communication units 120. The fixed network 110 may also comprise one or more console sites, each of which may comprise one or more dispatch consoles. In the case of a trunked system, the fixed network 110 may also comprise a zone controller that manages and assigns Internet Protocol (IP) multicast addresses for payload (voice, data, video, etc.) and control messages between and among the various base sites. The functionality and purpose of base sites, console sites, and zone controllers are well known in the art and are therefore not discussed in any further detail herein.

The wireless communication resources may comprise any type of communication resource such as, for example, RF technologies, including, but not limited to Frequency Division Multiple Access (FDMA), Time Division Multiple Access (TDMA), Code Division Multiple Access (CDMA), Orthogonal Frequency Division Multiple Access (OFDMA), and the like. Other wireless technologies, such as those now known or later to be developed and including, but not limited to, infrared, Bluetooth, electric field, electromagnetic, or electrostatic transmissions, may also offer suitable substitutes.

The communication units 120 may be mobile or portable wireless radio units, cellular radio/telephones, or any other type of device capable of wirelessly communicating with the fixed network 110. The communications units 120 are also often referred to in the art as "radios" or "subscribers." As shown in FIG. 1, each communication unit 120 may also be coupled to a mobile device 140 such as a video terminal, portable computer, or the like. Of course, while the communication unit 120 and the mobile device 140 are illustrated as separate units, they may also be integrated into a single device, such as, for example, a portable computer with an integrated wireless card.

Practitioners skilled in the art will appreciate that the system 100 may also comprise various other elements not shown in FIG. 1. For example, the communication system 100 may be connected to a number of additional content sources, such as the Internet or various Intranets. The fixed network 110 may also comprise multiple interconnected zones, each containing a zone controller, base sites, and data servers. The system 100 may also be linked to a public switched telephone network (PSTN), a paging network, or a facsimile machine.

Figure 2:
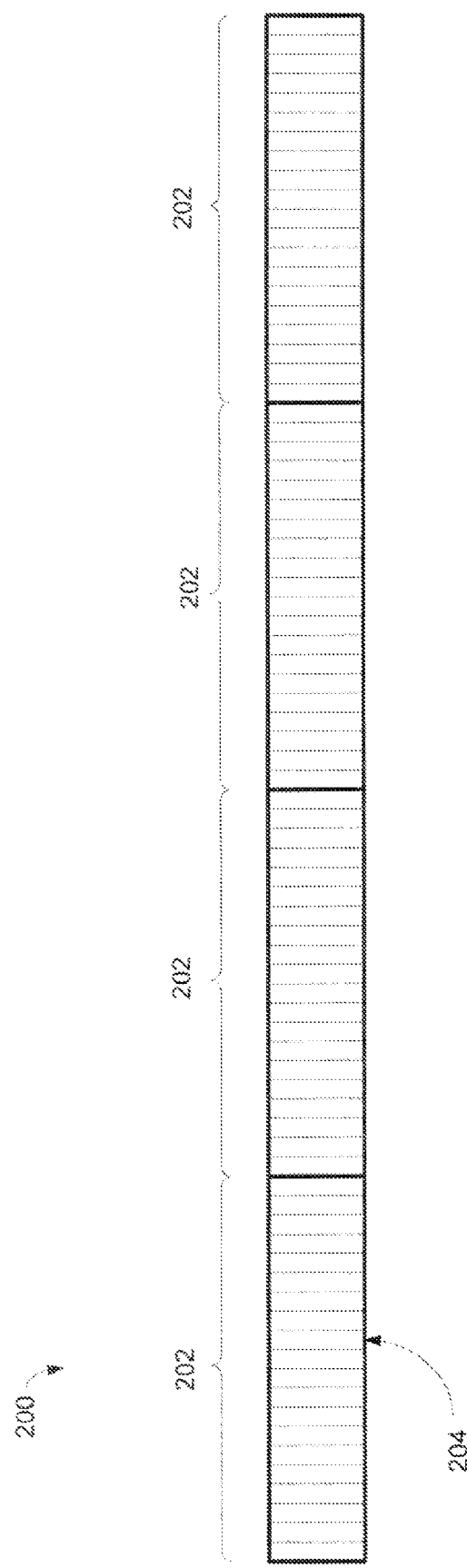
FIG. 2 shows one embodiment of a controlled access channel in accordance with the present disclosure.

FIG. 2 illustrates one exemplary embodiment of an inbound controlled access packet data channel (also referred to herein as "controlled access channel") that may be utilized for transmission of scheduled data messages from a communication unit 120 to the fixed network 110 in the system of FIG. 1. As shown, the controlled access channel 200 comprises a plurality of discrete slots 202, each of which is capable of being used to transmit a singe scheduled data message. Preferably, the size of each slot 202 is chosen so as to accommodate the largest expected scheduled data message that can be transmitted on the control access channel, although any size may be chosen. The controlled access channel 200 is also delineated into a plurality of microslots 204. As will be understood from the below description, the microslots 204 provide a method for determining a specific moment in time within a particular time interval. In the embodiment described herein, each slot 202 is 150 ms in duration and comprises 20 microslots 204, each having a duration of 7.5 ms. However, other durations for the slots 202 and microslots 204 may also be used.

Figure 3:
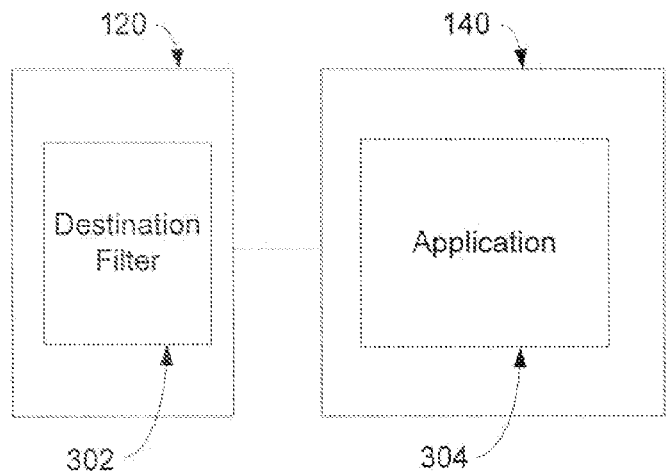
FIG. 3 shows one embodiment of a communication unit and associated mobile device in accordance with the present disclosure.

FIG. 3 illustrates one exemplary embodiment of a communication unit 120 and an associated mobile device 140 that is configured to transmit scheduled data messages on the controlled access channel 200 in accordance with the present disclosure. The mobile device 140 comprises at least one application 304 that is configured to generate data messages on a scheduled basis and pass the scheduled data messages to the communication unit 120 for transmission to the fixed network 110. The nature and purpose of the application 304 is dependent on the specific communication system 100. For example, in one embodiment, each mobile device 140 may be associated with a different motor vehicle, in which case the application 304 may be configured to generate short data messages, at preset intervals, indicative of location information for the associated motor vehicle. Of course, other types of applications may also be utilized and the present disclosure is not intended to be limited to any specific type of mobile device or application.

Each mobile device 140 may also be assigned to a particular set of slots 202 on the controlled access channel 200 when that particular mobile device 140 is to transmit its scheduled data messages. For each mobile device 140, the slots 202 may be assigned at preset intervals, although any assignment method may be used so long as only one mobile device 140 is assigned to any slot 202. In this way, each instance in time can only be used for scheduled data message transmissions by a single mobile device 140. However, it should be understood that not every single slot 202 need be assigned to a mobile device 140. For example, in one embodiment, a group of slots may remain unassigned and reserved for contention opportunities amongst multiple mobile devices 140 when the assigned slots are not sufficient to accommodate the data messages from a particular mobile device 140.

In some instances, the communication system 100 may also comprise mobile devices 140 and/or applications 304 that are not configured to generate data messages for scheduled transmission on the controlled access channel 200, but are instead configured to generate unscheduled data messages that are to be transmitted using one or more classic packet data channels. In this case, as shown in FIG. 3, the communication unit 120 may also comprise a destination filter 302. The destination filter 302 may comprise a list of destination addresses, such as destination IP address and destination ports, which are reserved only for scheduled data messages that are to be transmitted on the controlled access channel 200. As will be discussed in more detail below, this permits scheduled data messages intended for transmission on the controlled access channel 200 to be efficiently filtered from unscheduled data messages that are not intended for transmission on the controlled access channel 200. In one embodiment, the communication unit 120 may be configured with the destination filter 302 by the application 304 via Simple Network Management Protocol (SNMP), although other methods may also be used.

Each communication unit 120 is also preferably aligned in absolute time and in a predefined sequence with respect to other communication units 120 to ensure that the communication units 120 are synchronized. In one embodiment, this synchronization is accomplished by a time synchronization signal being sent from the fixed network 110 to the communication units 120, via, for example, a control channel. In an APCO Project 25 compliant system, the time synchronization signal may be a SYNC_BCST OSP signal that is being processed for standardization and transmitted periodically to the communication units 120 to ensure that the communication units 120 can derive the necessary synchronization. The SYNC_BCST OSP signal may also comprise information indicative of specific hour, minute and microslot parameters to indicate the then current time, where the microslot parameter identifies the number of microslots that have elapsed at the then current time since the occurrence of a first microslot within the specific hour and minute. However, many different methods for synchronizing communication units are known in the art and the present disclosure is not to be limited to any specific method. The communication unit 120 may also forward the synchronized time information to the application 304 to enable the application 304 to accurately schedule data message transmissions.

Figure 4:
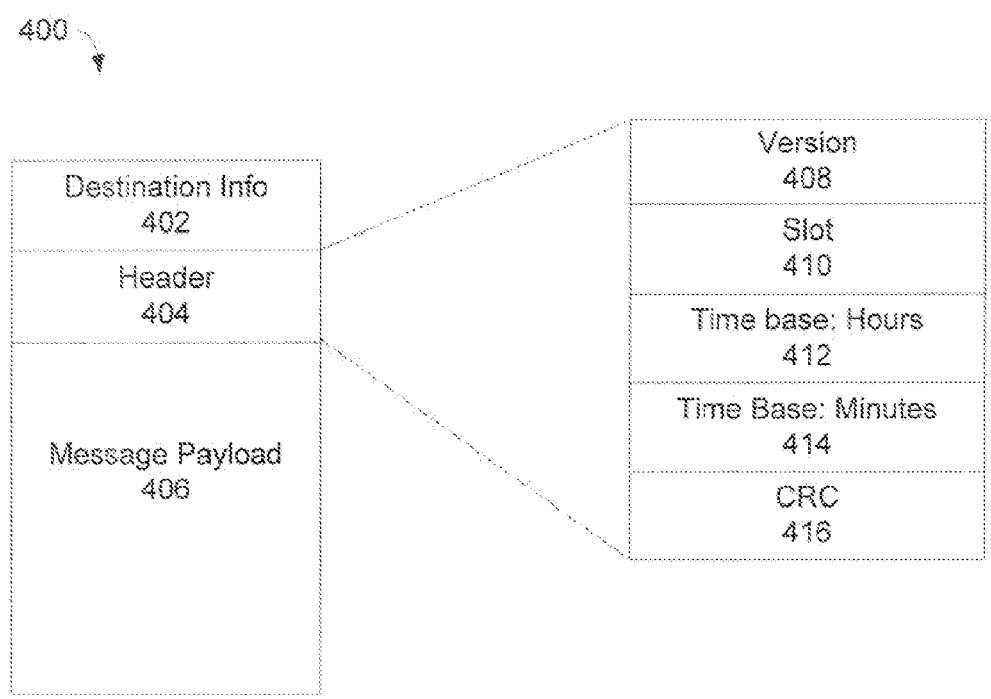
FIG. 4 shows one embodiment of a scheduled data message structure in accordance with the present disclosure.

FIG. 4 illustrates one exemplary embodiment of the structure of a scheduled data message 400 that may be generated by the application 304 in accordance with the present disclosure. As shown, the scheduled data message 400 comprises destination information 402, a header 404, and a message payload 406. The destination information 402 comprises a destination address to which the scheduled data message 400 is to be transmitted, and the message payload 406 comprises the substance of the data message 400 to be transmitted.

The header 404 comprises information indicative of a time when the scheduled data message 400 should be transmitted. For example, in the illustrated embodiment, the header 404 comprises an hour field 412 and a minute field 414 that identifies the hour and minute, respectively, during which the scheduled data message 400 should be transmitted. The header 404 also comprises a slot field 410 indicative of the slot number, within the identified minute of the identified hour, in which the scheduled data message should be transmitted. The particular method in which the hour, minute, and slot information is utilized will be described in more detail with regards to FIG. 6.

As shown in FIG. 4, the header information also comprises a Cyclic Redundancy Checksum (CRC) 416 of the slot field 410, hour field 412, and minute field 414. The CRC 416 is used to detect whether a valid header has been included with the scheduled data message 400, and thus, as will be described in more detail below, prevents misinterpretation of data messages provided to the communication unit 120 from the mobile device 140. The header 400 may also comprise a version field 408 to identify the version of the protocol being utilized by the application 304.

In one embodiment, the header 404 may be 6 octets in size, with one octet being used for the version field 408, two octets for the slot field 410, one octet for the hour field 412, one octet for the minute field 414, and one octet for the CRC field 416. However, the size of the header 404 and each field in the header 404 may of course be altered as a matter of design choice.

Figure 5:
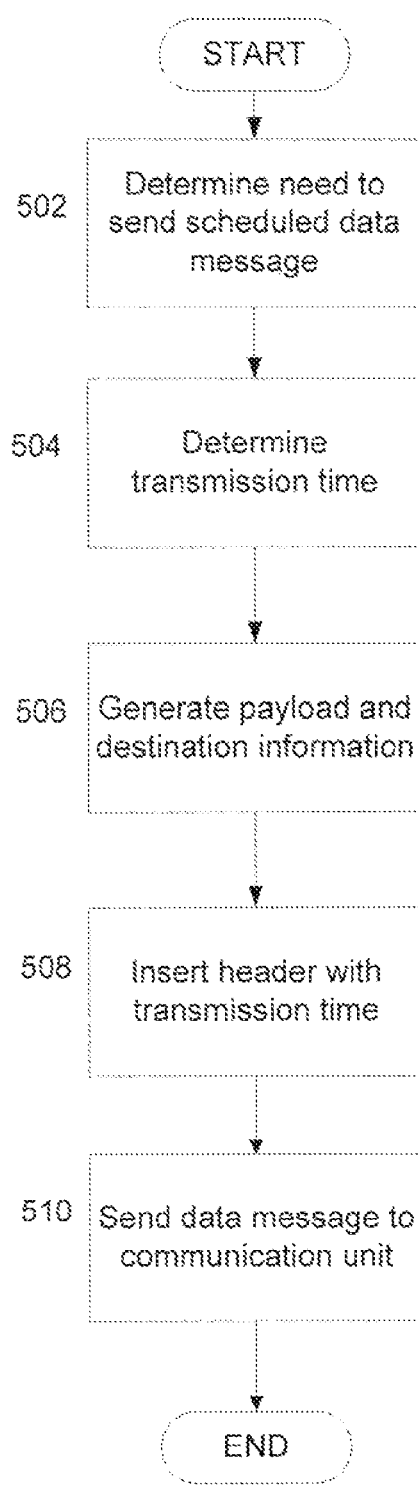
FIG. 5 shows one embodiment of a method for generating a data message in accordance with the present disclosure.

FIG. 5 illustrates one exemplary embodiment of a method for generating the scheduled data message 400 for transmission on the controlled access channel 200. In step 502, the application 304 in the mobile device 140 determines that a scheduled data message 400 needs to be sent to the fixed network 110. The application 304 determines a specific time, using the hour, minute, and slot number, when the scheduled data message 400 is to be transmitted in step 504. For example, in one embodiment, the specific time is determined based on the next available slot time that has been assigned to the mobile device 140. Additionally, the chosen transmission time provides a sufficient delay to ensure that the communication unit 120 is capable of processing the scheduled data message prior to the transmission time.

In step 506, the application 304 generates the message payload and the destination address, and inserts a header 404 in front of the message payload to identify the determined transmission time in step 508. As noted above, the transmission time is specified in the header using an hour field, a minute field, and a slot field. As also noted above, the application 304 may further comprise version information and a CRC checksum of the hour, minute, and slot fields in the header 404. In step 510, the application 304 sends the scheduled data message 400 to the communication unit 120, where the scheduled data message 400 is processed and transmitted based on the header information 404.

Figure 6:
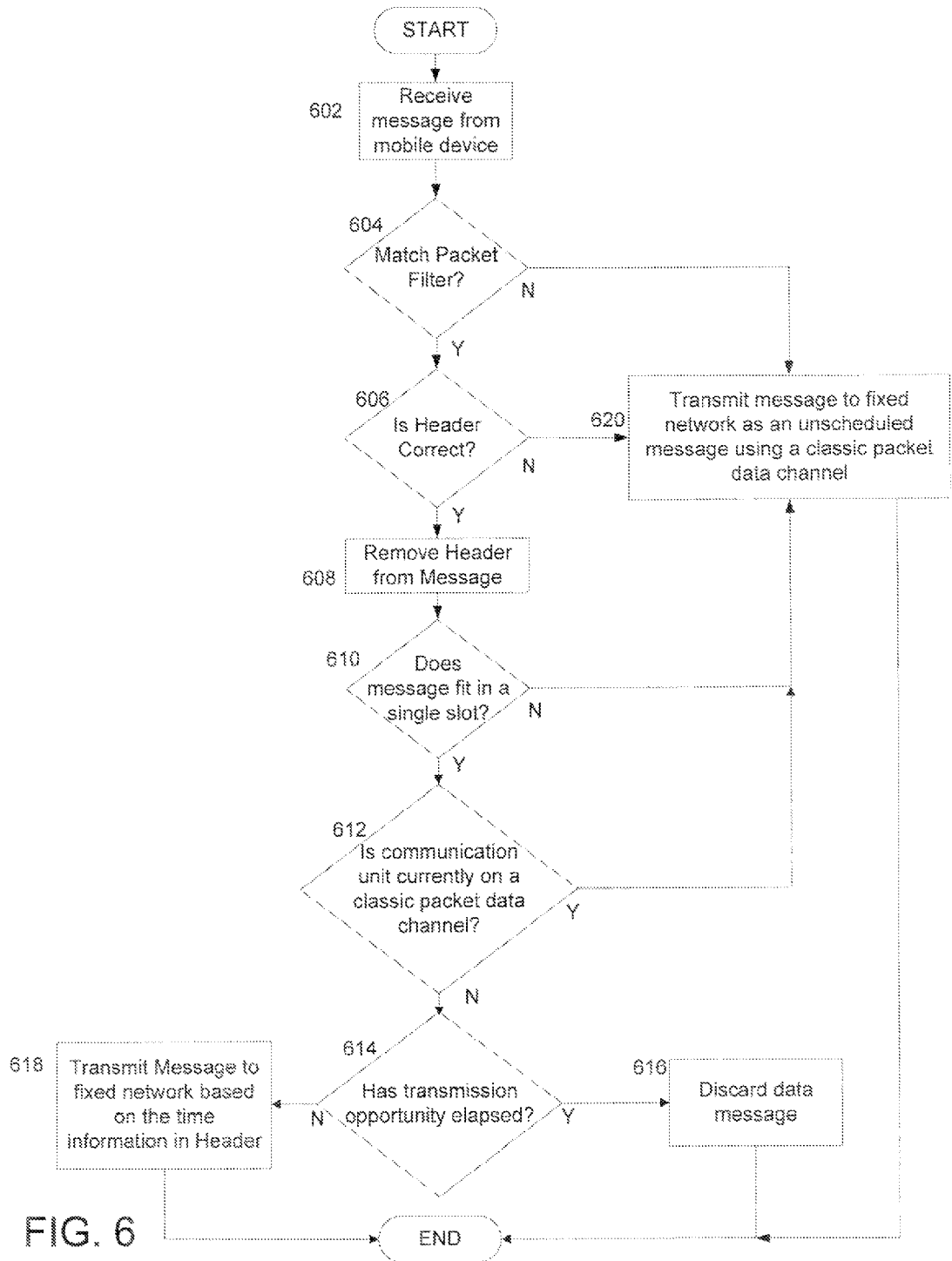
FIG. 6 shows one embodiment of a method for processing and transmitting a data message in accordance with the present disclosure.

FIG. 6 illustrates one exemplary embodiment of a method for processing data messages received by the communication unit 120 in accordance with the present disclosure. The communication unit 120 receives a data message from the application 304 in the mobile device 140 in step 602. In step 604, the communication unit 120 determines whether the destination information provided in the received data message matches a destination address in the destination filter 302. If there is a match, the communication unit 120 identifies the received data message as a potential scheduled data message intended for transmission on the controlled access channel 200 and the process proceeds to step 606. If there is no match, the received data message is processed as an unscheduled data message and is transmitted using a classical packet data channel in step 620.

In step 606, the communication unit 120 determines whether the received data message comprises header information that is correctly formatted for a scheduled data message. In one embodiment, this involves the communication unit 120 checking whether the data message comprises a header 404, and validating the hour and minute fields of the header 404 to make sure that they are within an acceptable range (i.e., 0 to 23 and 0 to 59, respectively). This step may also involve the communication unit 120 validating the CRC checksum for the slot, hour, and minute fields. The specific process for validating a CRC checksum is well known and is therefore not discussed in detail herein. If the data message does not comprise a header 404 that is correctly formatted, the process proceeds to step 620 and the data message is transmitted as an unscheduled data message on a classical packet data channel. If, however, the data message comprises a header 404 that is correctly formatted for a scheduled data message, the process proceeds to step 608.

In step 608, the communication unit 120 strips the header 404 from the received data message and determines whether the resulting data message (i.e., without the header) is capable of being transmitted within a single slot 202 in the controlled access channel 200 in step 610. If the resulting data message is not capable of being transmitted within a single slot 202, the data message is transmitted as an unscheduled data message on a classical packet data channel in step 620. If, however, the resulting data message is capable of being transmitted within a single slot 202, the process proceeds to step 612.

In step 612, it is determined whether the communication unit 120 is currently transmitting on a classic packet data channel. If the communication unit is already transmitting on a classic packet data channel, the data message is transmitted to the fixed network 110 using the classic packet data channel in step 620. If the communication unit 120 is not already transmitting on a classic packet data channel, the process proceeds to step 614.

In step 614, the communication unit 120 determines whether the transmission opportunity for the data message has elapsed. More specifically, the communication unit 120 determines whether the transmission time indicated in the header 404 of the data message has already passed. This may occur, for example, if the mobile device 140 provides a data message that is improperly scheduled for a time that has already occurred, or if the processing of the data message results in the message not being ready for transmission until after that the transmission time has passed. Regardless of the reason, if the transmission opportunity has elapsed, the communication unit 120 discards the data message in step 616. If the transmission opportunity has not elapsed, the process proceeds to step 618.

In step 618, the communication unit 120 transmits the data message to the fixed network 110 based on the time information that was provided in the header. More particularly, the time that the communication unit 120 launches the data message is determined based on the slot, hour, and minutes fields in the header 302. In one embodiment, this is accomplished by the communication unit 120 calculating the specific microslot 204, within the identified hour and minute, when transmission of the data message should begin by using the following formula:

$$\text{Microslot} = (\text{Slot Number} * \text{Slot Size})/\text{Microslot Size} \qquad (1)$$

For instance, let us assume that each microslot is 75 ms in duration and each slot is 150 ms in duration. In this case, the microslot when the data message should be transmitted during a specified hour and minute is calculated as follows:

$$\text{Microslot} = (\text{Slot Number} * 0.150)/0.0075 \qquad (2)$$

Thus, for example, if the header 404 of a scheduled data message 400 indicates that the scheduled data message 400 is to be transmitted at hour 23, minute 12, and slot 3, the communication unit 120 calculates that the scheduled data message 400 should be transmitted at the 60th microslot since the beginning of the twelfth minute in the twenty-third hour. As a result, the scheduled data message transmission would commence at 23:12:00.45.

By means of the aforementioned disclosure, a protocol is provided for communicating between mobile devices 140 and communication units 120 to enable transmission of scheduled data messages at a specific time on a controlled access channel 200. As a result, multiple devices can transmit data message on a single controlled access channel without the contention issues that often occur with unscheduled data message sent on classic packet data channels. Additionally, since there is little risk that the scheduled data message would be corrupted due to interference from data message transmitted by other mobile devices, the scheduled data messages in the present disclosure may also be transmitted as unconfirmed messages (i.e., without requiring an acknowledgment signal to be sent back to the transmitting device).

Further advantages and modifications of the above described system and method will readily occur to those skilled in the art. The disclosure, in its broader aspects, is therefore not limited to the specific details, representative system and methods, and illustrative examples shown and described above. Various modifications and variations can be made to the above specification without departing from the scope or spirit of the present disclosure, and it is intended that the present disclosure cover all such modifications and variations provided they come within the scope of the following claims and their equivalents.

What is claimed is:

1. A method for transmitting data messages in a communication system comprising:
   receiving, at a communication unit, a data message from a mobile device;
   determining that the data message comprises a header of a predetermined format, wherein the header comprises an hour field comprising information indicative of an hour during which the data message should be transmitted by the communication unit, a minute field comprising information indicative of a minute during which the data message should be transmitted by the communication unit, and a slot field comprising information indicative of a slot number during which the data message should be transmitted by the communication unit; and
   transmitting the data message by the communication unit from the communication unit to a fixed network on a controlled access channel at a transmission time that is determined based on information provided in the hour field, the minute field, and the slot field.

2. The method of claim 1 further comprising:
   prior to transmitting the data message, determining whether a destination address identified in the data message matches at least one of a predetermined list of destination addresses in a destination filter; and
   transmitting the data message on the controlled access channel only if the destination address identified in the data message matches at least one of the predetermined list of destination addresses in the destination filter.

3. The method of claim 1 wherein the header further comprises a cyclic redundancy checksum field comprising a cyclic redundancy checksum of the hour field, the minute field, and the slot field.

4. The method of claim 1 further comprising:
   prior to transmitting the data message, validating that the header is correctly formatted; and
   transmitting the data message on the controlled access channel only if the header is correctly formatted.

5. The method of claim 4 wherein validating the header comprises validating the cyclic redundancy checksum for the hour field, the minute field, and the slot field.

6. The method of claim 1 further comprising, prior to transmitting the message, removing the header from the data message.

7. The method of claim 1 further comprising:
   determining whether the data message is capable of being transmitted during a single slot in the controlled access channel; and
   transmitting the data message on the controlled access channel only if the data message is capable of being transmitted during a single slot.

8. The method of claim 7 further comprising:
   determining whether the communication unit is transmitting on a classic packet data channel; and
   transmitting the data message on the controlled access channel only if the communication unit is not transmitting on the classic packet data channel.

9. The method of claim 8 further comprising:
   determining whether the transmission time has elapsed; and
   transmitting the data message on the controlled access channel only if the transmission time has not elapsed.

10. The method of claim 1 wherein transmitting the data message on the controlled access channel at the transmission time that is determined based on information provided in the hour field, the minute field, and the slot field comprises determining a microslot within a time interval indicated by the hour and minute fields when transmission of the data message is to be transmitted.

11. The method of claim 10 wherein the microslot is determined by the formula (SN * SS)/MS, wherein SN is the slot number indicated in the slot field, SS is the size of each slot in the controlled access channel, and MS is the size of each microslot in the controlled access channel.

12. A method for transmitting data messages in a communication system comprising:
generating, by a mobile device, a scheduled data message, the scheduled data message comprising a payload field comprising message information that is to be transmitted to a fixed network, a destination address field comprising information indicative of a destination address to which the scheduled data message is to be transmitted by a communication unit, and a header comprising time information indicative of a time when the scheduled data message is to be transmitted by the communication unit, wherein the time information in the header comprises an hour field comprising information indicative of an hour during which the data message is to be transmitted by the communication unit, a minute field comprising information indicative of the minute during which the data message is to be transmitted by the communication unit, and a slot field comprising information indicative of a slot number during which the scheduled data message is to be transmitted by the communication unit; and
sending the scheduled data message to the communication unit, wherein the communication unit is configured to transmit the scheduled data message to the fixed network at the time indicated by the time information in the header.

13. The method of claim 12 wherein the header further includes a cyclic redundancy checksum field including a cyclic redundancy checksum of the hour field, the minute field, and the slot field.

14. A communication system comprising:
a fixed network;
a plurality of communication units synchronized in time with one another, each of the plurality of communication units being capable of communicating with the fixed network via a controlled access channel, the controlled access channel being delineated into a plurality of slots and a plurality of microslots; and
a plurality of mobile devices, each of the plurality of mobile devices being coupled to one of the plurality of communication units;
wherein each of the plurality of mobile devices comprises at least one application capable of generating a scheduled data message indicating when the data message is to be transmitted by a communication unit, the scheduled data message having a message payload, destination information, and a header having an hour field comprising information indicative of an hour during which the data message is to be transmitted by the communication unit, a minute field comprising information indicative of the minute during which the data message is to be transmitted by the communication unit, and a slot field comprising information indicative of a slot number during which the scheduled data message is to be transmitted by the communication unit; and
wherein each of the plurality of communication units is configured to receive data messages from an associated device, determine that a received data message is a scheduled data message, and transmit the scheduled data message at a transmission time based on information in the hour field, the minute field, and the slot field of the header.

15. The communication system of claim 14 wherein the plurality of communication units are synchronized via a synchronization signal transmitted from the fixed network to the plurality of communication units, the synchronization signaling being configured to identify a current time.

16. The communication system of claim 14 wherein the header further includes a cyclic redundancy checksum field comprising a cyclic redundancy checksum of the hour field, the minute field, and the slot field; and wherein each of the plurality of communication units is further configured to validate that the header is correctly formatted by validating the cyclic redundancy checksum for the hour field, the minute field, and the slot field.

17. The communication system of claim 14 wherein each of the plurality of communication units comprises a destination filter comprising a predetermined set of destination addresses; and each of the plurality of communication units are further configured to determine whether a destination address in the destination information of the received message matches at least one of a predetermined list of destination addresses in a destination filter, and transmit the received data message on the controlled access channel only if the destination address in the destination information of the received message matches at least one of a predetermined list of destination addresses in a destination filter.

18. The communication system of claim 14 wherein each of the plurality of communication units are further configured to determine whether the received data message is capable of being transmitted during a single slot in the controlled access channel, and transmit the received data message on the controlled access channel only if the received data message is capable of being transmitted during a single slot.

19. The communication system of claim 14 wherein each of the plurality of communication units is configured to determine whether a classic packet data channel is currently being used for transmitting received data messages, and transmit the received data message on the controlled access channel only if the classic packet data channel is not currently being used for transmitting received data messages.

20. The communication system of claim 14 wherein each of the plurality of communication units is configured to determine whether the transmission time has elapsed, and transmit the received data message on the controlled access channel only if the transmission time has not elapsed.

* * * * *

UNITED STATES PATENT AND TRADEMARK OFFICE
CERTIFICATE OF CORRECTION

PATENT NO. : 8,300,619 B2  
APPLICATION NO. : 11/938545  
DATED : October 30, 2012  
INVENTOR(S) : Valdivia et al.

Page 1 of 1

It is certified that error appears in the above-identified patent and that said Letters Patent is hereby corrected as shown below:

In Column 3, Line 64, delete "singe" and insert -- single --, therefor.

Signed and Sealed this  
Fifth Day of February, 2013

Teresa Stanek Rea  
*Acting Director of the United States Patent and Trademark Office*